July 8, 1969 J. G. CIFELLI 3,454,115
HOLD DOWN DEVICE FOR CONDUIT-ENCLOSED CABLES OR WIRES
Filed June 20, 1967
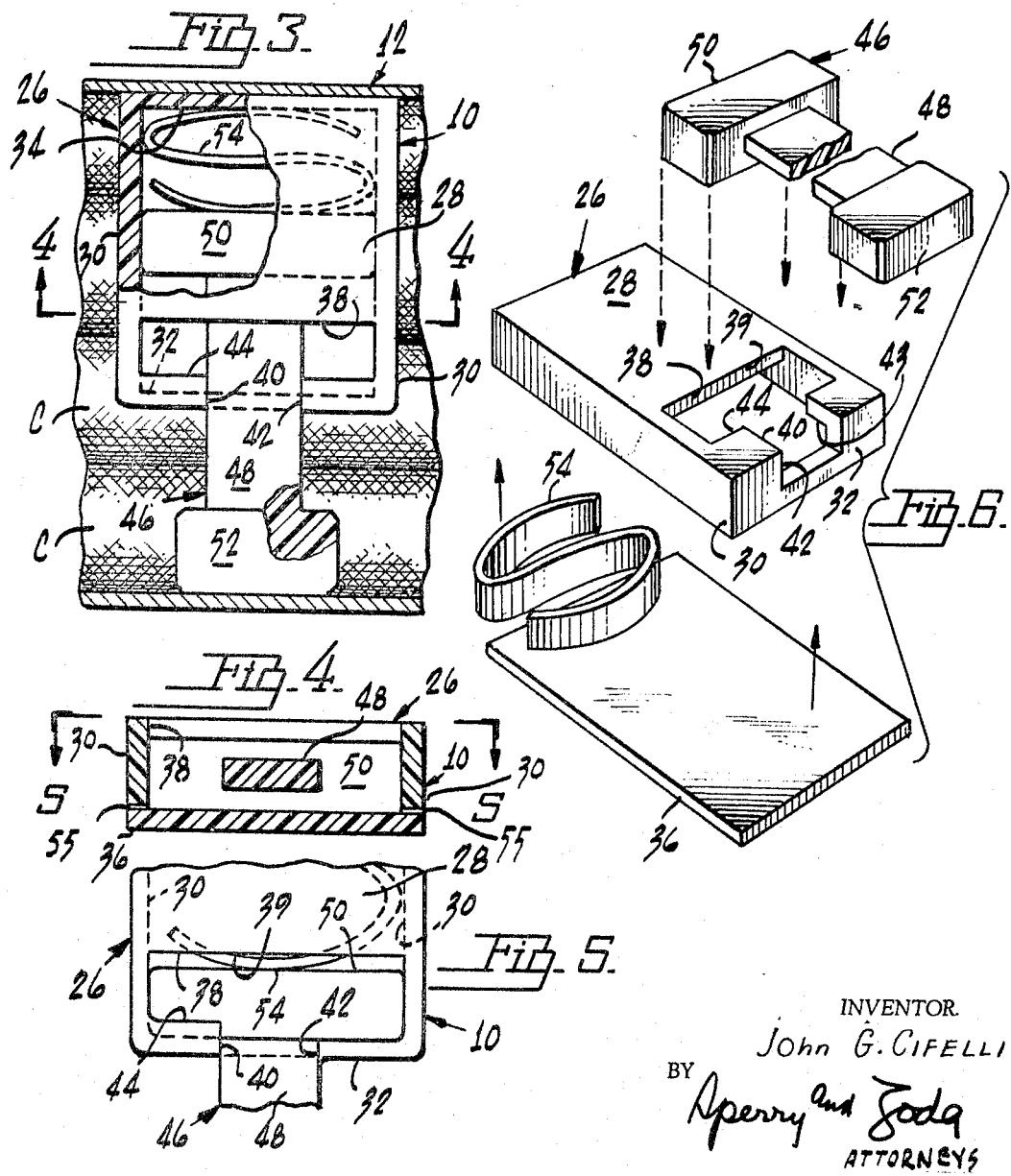
INVENTOR.
John G. Cifelli
BY Sperry and Zoda
ATTORNEYS

United States Patent Office 3,454,115
Patented July 8, 1969

3,454,115
HOLD DOWN DEVICE FOR CONDUIT-ENCLOSED CABLES OR WIRES
John G. Cifelli, 137 Linden Lane,
Princeton, N.J. 08540
Filed June 20, 1967, Ser. No. 647,441
Int. Cl. H01b 7/00
U.S. Cl. 174—135                          5 Claims

ABSTRACT OF THE DISCLOSURE

A telescopic assembly is inserted in a conduit through which electrical cables extend. The assembly extends across an open side of the conduit to prevent the cables from bulging through the open side, thus to facilitate application of the conduit cover. The device expands to accommodate it to the width of the particular conduit to which it is applied, and includes means to permit its assembly with components of various, selected lengths to further increase the range of conduit widths to which it may be applied.

BACKGROUND OF THE INVENTION

Field of invention

The invention pertains to the electricity field, and in particular, to the conduit, cable, and conductor art. Within this art, the invention pertains to supports, hold downs, or retaining means for conductors or cables extending through a conduit.

Description of the prior art

A continuing difficulty encountered by those field workers who are responsible for in situ installation of electrical conduits, is the application of covers to the conduits in situations in which the conduit space is so taken up with cables extending therethrough as to cause the cable to bulge through the open side to which the cover is supposed to be applied. Cables of heavy duty construction, such as are here involved in most instances, are difficult to compress, and in fact, are possessed of only limited flexibility and compressibility. In these circumstances, it becomes exceedingly difficult to force the cables down into the conduit to the point at which the application of the cover is possible. Thus, before the cover can be applied, all the cables must be pressed into the conduit to such an extent as not to project above the plane that would be occupied by the applied cover.

In view of this difficulty, field workers in the art resort to various expedients. For example, it is not uncommon for the worker to cut a small piece of wood, insert it in the open side of the conduit longitudinally of the conduit, and then turn the piece of wood to a position in which it extends transversely of the conduit, across the cables that extend therethrough. The open side of the conduit has inturned side flanges or overhangs, and the ends of the inserted element are forced under the overhangs, to thus bridge the cables and hold them down to allow application of the cover.

This practice, however, is not only time consuming and inefficient, and difficult to carry out, but also, may actually represent a violation of building codes in many jurisdictions.

The prior art has not, to my knowledge, produced a true solution to the problem. While it is known to provide means within a conduit in the nature of a wire fastening or securing means, a device that truly solves the problem has so far not been devised, so far as is known. Patent No. 2,087,640 issued to Lefebvre Du Prey is typical.

SUMMARY OF THE INVENTION

My approach to solution of the problems that have existed as noted above, involves the provision of a telescopic assemblage of separably connected parts, so designed as to permit expansion of the overall length of said assemblage, across a conduit in position holding down the wires within the open side of the conduit. To this end, the device includes, in the main, first and second cable-bridging elements. The first element, in a typical embodiment, is in the form of a rectangular, shallow box-like housing, having at one end a generally T-shaped opening. Within the housing, a spring is positioned, and may take various forms, a preferred form being a leaf spring that could be S-shaped, V-shaped, or otherwise fashioned in such a way as to assert a continuous, resilient, yielding pressure against the second cable bridging element, which has a T-shaped inner end insertable through the above mentioned opening into engagement with the spring. The second element projects out of the T-shaped opening, so as to be forced by the spring into engagement with a conduit side wall opposite a side wall engaged by the box-like housing. In this way, the connected elements span a multiplicity of cables housed within the conduit, and press the cables down within the housing in such a way as to facilitate application of the conduit cover.

The telescopic arrangement that is presently preferred has the advantage that one end of the device can be inserted under the inwardly turned side flange of the conduit at one side of the conduit, after which the device can be temporarily, against the restraint of the spring, shortened in length by the user, sufficiently to permit the other end of the device to be inserted under the opposite overhang. There is no necessity for rotating the device within the conduit, a practice which is difficult in view of the great pressure exerted by the cables, tending to inhibit such rotational movement severely. Instead, once the device is inserted, it is free to expand, and thus holds the cables down, allowing application of the conduit cover. The device is preferably made of molded plastic except of course for the spring, which is completely insulated from the cables by the surrounding housing material. Thus, the invention, though capable of manufacture at a very low cost, nevertheless can have no conceivable objection from building inspectors, since it presents no fire hazard and does not tend to cut or bite into the insulation of the cables.

BRIEF DESCRIPTION OF THE DRAWING

FIGURE 1 is a transverse sectional view through a conduit containing a multiplicity of heavy duty cables, with the device constituting the present invention being shown in its operative position, spanning and holding down the several cables;

FIGURE 2 is a fragmentary longitudinal sectional view through the conduit, with the device in place, the device being shown in end elevation, taken on line 2—2 of FIGURE 1;

FIGURE 3 is an enlarged view approximately on line 3—3 of FIGURE 2, portions of the device being shown in top plan and portions being sectioned away;

FIGURE 4 is a transverse sectional view through the device constituting the present invention, taken on the same scale as FIGURE 3, substantially on line 4—4 of FIGURE 3;

FIGURE 5 is a fragmentary view of the device as seen from line 5—5 of FIGURE 4, with the extensible plunger element in its fully extended position as it would appear prior to insertion in a conduit; and FIGURE 6 is an exploded perspective view of the device constituting the present invention, a portion of the plunger shank being removed.

DESCRIPTION OF THE PREFERRED EMBODIMENT

Referring first to FIGURES 1–3, the hold-down device constituting the present invention has been generally designated 10, and is shown in these views of the drawing as it appears when in use. A conduit for electrical cables has been generally designated 12, and constitutes no part of the present invention, per se. A conduit of this type may be of any length, and in general, is of rectangular cross-sectional configuration as shown in FIGURE 1, having a metal body 14 formed with a flat bottom 16, and opposed side walls 18. Opposite the bottom 16, the body is provided with an open side, for insertion of the cables C.

Projecting inwardly from the respective side walls 18 are side flanges or overhangs 20 of the conduit body, disposed in the plane of the open side of the conduit, and provided for the purpose of affording surfaces of the conduit body to which the conduit cover 22 may be secured. The conduit cover is flat, and as seen from FIGURE 1, screws 24 may extend through smooth-walled openings of the conduit cover, being threadably engaged in registering, threaded openings of the flanges 20.

Heretofore, when cables C are crowded into the conduit, they tend to bulge through the open side, into the plane normally occupied by the applied cover. In view of the comparatively unyielding nature of the heavy duty cable material, in particular the insulation thereof, it becomes exceedingly difficult to apply the cover, and considerable strength is needed to hold the cover down against the flanges, while applying the screws.

The device 10 constituting the present invention aims to obviate these difficulties. To this end, the device includes a first cable-bridging element generally designated 26, in the form of a rectangular, hollow, shallow housing of rigid, electrical insulation material such as a thermosetting plastic. In the illustrated example, the housing includes a flat top wall 28, side walls 30 integral with and depending from the top wall, and inner and outer end walls 32, 34 respectively.

The housing also includes a flat bottom wall 36. In the illustrated example, the bottom wall 36 is formed separately from the body portion of the housing as clearly seen from FIGURE 6, in order to permit insertion of a spring within the housing, and also to lend the housing construction to conventional molding techniques. Other arrangements might be utilized, as for example the bottom wall may be molded integral with the body, with the end wall 34 being separately applied after insertion of the spring. It is mainly important that the construction permit molding of the body at comparatively low cost, and that it permit, also, insertion of the spring and of the cooperating, extensible element of the device.

I provide a means for assembling the housing with the extensible element, in that I provide, as shown in FIGURE 6, an approximately T-shaped opening 38 in the top wall 28 of the housing, said T-shaped opening having a main, transverse portion 39 extending across the top wall 28 to the side wall 30, in closely spaced relation to the inner end wall 32. Extending longitudinally of the top wall 28 between portion 39 and inner end wall 32 is the other portion 40 of the T-shaped opening 38. Portion 40 communicates with a recess or opening 42 formed in inner end wall 32 medially between the opposite side walls 30. The spacing of portion 39 from end wall 30 defines, at opposite sides of the opening portion 40, overhanging ledges or retaining lips 43, 44, adapted to overlie the inserted inner end of the second cable-bridging element 46.

Element 46 is in the form of a plunger, having a shank 48 of rectangular cross-section slidably engageable in recess or opening 42. Integral with the shank, at one end thereof, is a rectangular base 50 of the element 46, while at the other end of the shank, there is provided, in a preferred embodiment, a head 52. Head 52 may be molded integral with the shank 48. Alternatively, it could be in the form of a separate, rubber cap applicable to the shank.

As previously mentioned, the device includes a spring. In the illustrated example, an S-spring 54 is provided. However, the spring might take other shapes, and could even be a compression, coil spring if this should be so desired. In any event, spring 54 is inserted in the housing or first cable-bridging element 26, after which the bottom wall 36 is secured to the body portion of the housing. In the illustrated example, bottom wall 36 is cemented as at 55 to the lower edges of the side walls 30 of the housing portion of the device. However, it is possible to use other means for assembling the components of the housing, as for example screws, clamps, detents, etc. It is believed that these alternative expedients are sufficiently obvious as not to require special illustration herein.

In any event, the elements 46, 26 are assembled with each other quickly and easily, merely by insertion of the base 50 through the transverse main portion 39 of T-shaped opening 38. Referring to FIGURE 6, base 50 is simply shifted downwardly through portion 39 as indicated by the direction arrows in FIGURE 6. When this is done, base 50 moves into the interior of the housing portion of the device, with shank 48 projecting through opening 42 as shown in FIGURES 3 and 5. Spring 54 bears against base 50, as shown in FIGURE 5 and also in FIGURE 3, so as to normally urge the plunger outwardly of the device, to the position shown in FIGURE 5. Under these circumstances, the retention lips 43 and 44 overlie a portion of the base 50, so as to prevent accidental disassembly of the device, the base 50 now being out of registration to a slight degree, with respect to the portion 39 of opening 38.

In use, and assuming that the cables C are all inserted within the conduit and must be pressed down therein, one may insert the device at either end thereof into position, under one of the overhangs 20 of the conduit. Then, the device is merely rocked downwardly, while being maintained in a shortened condition, to engage the other end of the device under the other overhang 20. With the cables being pressed down manually at opposite sides of the devices as necessary, the device is permitted to expand under the force of spring 54, and in this way, expands to the full width of the conduit as shown in FIGURE 1. Now, head 52 engages against one side wall 18 under the overhang 20 adjacent said one side wall, while the body portion of the housing or cable-bridging element 26 engages under the other overhang 20, abutting against the adjacent, other side wall 18.

The device is easy to use, as will be noted, and efficiently holds the cables down within the conduit, to permit swift and easily application of cover 22.

It will be noted that the element 46 can be molded in any of various lengths. In fact, a set of elements 46 can be provided the field worker, for assembly with a single form of the element 26. The element 46 of the set can be of various lengths, and the worker can select a length according to the width of the conduit. The selected element 46 can be swiftly assembled with the element 26, and can then be applied to the conduit in the manner described above.

I claim:
1. A hold-down device to temporarily retain cables within a conduit therefor having an open side through which the cables are inserted, for facilitating application of a cover to said open side, comprising an assembly of movably connected elements expansible within said conduit across the open side thereof into bridging relation to a plurality of cables housed within the conduit, said assembly including
(a) a hollow housing having a first opening in one end thereof and having a second opening formed in a wall of the housing inwardly from said one end thereof;

(b) a plunger telescoping within the housing, said plunger having one end insertable through the second opening of and slidably engaged in the housing, the other end of the plunger projecting through the first opening; and (c) resilient, yielding means tensioned between the housing and plunger and normally biasing the plunger outwardly of the housing, said one end of the plunger being out of registration with said second opening in all but one position to which the plunger is telescopically moved in respect to the housing, whereby to prevent separation of the plunger from the housing except when the plunger is in said one position.

2. A conduit-inserted cable hold down as in claim 1 wherein said second opening is in communication with the first opening, said second opening being of greater width than the first opening, the plunger having a shank projecting through said first opening and a base connected to the shank and formed to a width greater than the shank, said base of the plunger being insertable through the second opening of the housing and being slidably engaged within the housing.

3. A conduit-inserted cable hold-down as in claim 2 wherein said resilient, yielding means is interposed between the base of the plunger and the other end of the housing.

4. A conduit-inserted cable hold-down as in claim 3 wherein the second opening of the housing is spaced longitudinally of the housing from said one end thereof, whereby on projection of the plunger under the force of said resilient, yielding means, out of the housing to the maximum extent of said projection, the base of the plunger will be out of registration with the second opening, thus to prevent accidental separation of the plunger from the housing.

5. A conduit-inserted cable hold-down as in claim 4 further including a head on the other end of the plunger, engageable against one side wall of the conduit adjacent the open side of the conduit, said housing, on expansion of the resilient, yielding means, being engageable at its other end against the opposite side wall of the conduit.

References Cited

UNITED STATES PATENTS

| 1,716,708 | 6/1929 | Shipley et al. | 248—354 X |
| 1,790,706 | 2/1931 | Hill. | |
| 2,087,640 | 7/1937 | Lefebvre du Prey | 174—101 |
| 2,461,693 | 2/1949 | McAloon. | |
| 2,629,156 | 2/1953 | Kamens et al. | |
| 3,037,718 | 6/1962 | Pettit | 242—55.53 |
| 3,325,128 | 6/1967 | Elleboudt | 248—68 |

FOREIGN PATENTS 819,220   9/1959   Great Britain.

LARAMIE E. ASKIN, *Primary Examiner.*

U.S. Cl. X.R.

174—101